US009610990B2

(12) United States Patent
Kloepfer

(10) Patent No.: US 9,610,990 B2
(45) Date of Patent: Apr. 4, 2017

(54) APPARATUS AND METHOD FOR WARMING THE FLOOR OF A TRAILER

(71) Applicant: TITAN TRAILERS INC., Delhi (CA)

(72) Inventor: Michael Kloepfer, Delhi (CA)

(73) Assignee: TITAN TRAILERS INC., Delhi (CA)

( * ) Notice: Subject to any disclaimer, the term of this patent is extended or adjusted under 35 U.S.C. 154(b) by 277 days.

(21) Appl. No.: 14/043,089

(22) Filed: Oct. 1, 2013

(65) Prior Publication Data

US 2014/0027523 A1    Jan. 30, 2014

Related U.S. Application Data

(63) Continuation of application No. 12/469,534, filed on May 20, 2009, now Pat. No. 8,662,405.

(30) Foreign Application Priority Data

May 8, 2009    (CA) .................................... 2665668

(51) Int. Cl.
  *B62D 63/08*   (2006.01)
  *B62D 21/17*   (2006.01)
  (Continued)

(52) U.S. Cl.
  CPC ......... *B62D 63/08* (2013.01); *B60H 1/00364* (2013.01); *B60H 1/00492* (2013.01);
  (Continued)

(58) Field of Classification Search
  CPC ......... B62D 63/08; B62D 21/17; B60P 1/006; B60P 1/00; B60H 1/00364
  See application file for complete search history.

(56) References Cited

U.S. PATENT DOCUMENTS 1,318,457 A * 10/1919 Moorshead ................... 237/43
1,357,305 A * 11/1920 Alvord ............... B61D 27/0063
                                                     105/451

(Continued)

FOREIGN PATENT DOCUMENTS

JP    2002115856         4/2002
RU    2025430 C1 * 12/1994
SU     583065 A  * 12/1977

OTHER PUBLICATIONS

U.S. Appl. No. 12/469,534, Notice of Allowance dated Oct. 4, 2013.
(Continued)

*Primary Examiner* — Alissa Tompkins
*Assistant Examiner* — Phillip E Decker
(74) *Attorney, Agent, or Firm* — Borden Ladner Gervais LLP; Jason R. Mueller-Neuhaus

(57) ABSTRACT

A transportation trailer having a moving floor including a plurality of reciprocating slats for loading/unloading materials into the trailer. The trailer includes a system for warming the moving floor when the materials transported in the trailer freeze on the slats in cold weather. Using the pre-existing hollow structure of the slats, a stream of hot fluid or a hot fluid pipe is run inside the slats for thawing the frozen materials for unloading the trailer. The hot fluid may be provided from a hot fluid source on board of the trailer, for thawing the frozen materials while the trailer is on its way to the unloading site, or may be provided separately at the unloading site.

12 Claims, 12 Drawing Sheets

(51) Int. Cl.
   *B60H 1/22*   (2006.01)
   *B60H 1/00*   (2006.01)
   *B60P 1/28*   (2006.01)

(52) U.S. Cl.
   CPC ............. *B60H 1/22* (2013.01); *B60H 1/2203* (2013.01); *B60P 1/286* (2013.01); *B62D 21/17* (2013.01); *B60H 2001/00221* (2013.01)

(56) References Cited

U.S. PATENT DOCUMENTS

| | | | |
|---|---|---|---|
| 2,273,176 A * | 2/1942 | Burt | 237/69 |
| 2,449,932 A * | 9/1948 | Forsythe | F24D 5/00 |
| | | | 126/271.1 |
| 2,483,721 A | 10/1949 | Becker | |
| 2,595,613 A | 5/1952 | Spencer | |
| 2,756,000 A | 7/1956 | Anderson | |
| 2,760,726 A | 8/1956 | Parks et al. | |
| 2,799,481 A | 7/1957 | Becker | |
| 2,925,301 A | 2/1960 | Milligan | |
| 2,951,642 A | 9/1960 | Hazard | |
| 2,985,375 A | 5/1961 | Gardner | |
| 3,023,296 A * | 2/1962 | Barber | F24D 13/02 |
| | | | 219/213 |
| 3,148,675 A | 9/1964 | Menuto | |
| 3,800,858 A * | 4/1974 | Placek | B61D 7/32 |
| | | | 104/307 |
| 3,809,014 A | 5/1974 | Jones et al. | |
| 4,018,271 A | 4/1977 | Jones et al. | |
| 4,274,390 A | 6/1981 | Azuma | |
| 4,724,898 A | 2/1988 | Stolz et al. | |
| RE33,196 E * | 4/1990 | Foster | 62/344 |
| 5,244,037 A * | 9/1993 | Warnke | F24D 3/18 |
| | | | 237/66 |
| 5,301,798 A * | 4/1994 | Wilkens | 198/750.3 |
| RE35,156 E | 2/1996 | Hallstrom, Jr. | |
| 5,542,603 A | 8/1996 | Macduff | |
| 5,567,085 A | 10/1996 | Bruckelmyer | |
| 5,588,522 A | 12/1996 | Foster | |
| 5,839,568 A | 11/1998 | Clark | |
| 5,964,402 A | 10/1999 | Jakobson | |
| 6,043,455 A | 3/2000 | Kurita | |
| 6,332,580 B1 * | 12/2001 | Enander et al. | 237/2 A |
| 6,942,089 B2 * | 9/2005 | Quaeck | 198/750.1 |
| 7,021,372 B2 | 4/2006 | Pickard | |
| 7,222,801 B2 | 5/2007 | Meirana | |
| 7,320,395 B2 | 1/2008 | De Baat | |
| 7,556,141 B2 * | 7/2009 | Foster et al. | 198/750.2 |
| 7,965,509 B2 * | 6/2011 | Campbell | H01L 23/473 |
| | | | 165/104.33 |
| 2005/0118008 A1 | 6/2005 | Gabe | |
| 2006/0185691 A1 * | 8/2006 | Joseph | 134/22.1 |
| 2008/164005 A1 | 7/2008 | Keller | |
| 2010/0025194 A1 | 2/2010 | Stout et al. | |
| 2012/0204439 A1 | 8/2012 | Kloepfer | |

OTHER PUBLICATIONS

Hydronic Radiant Floor Heating, Canada Mortgage and Housing Corporation, http://www.cmbhc-schl.gc.ca/en/co/renoho/refash_010.cfm, 1996-2009.

* cited by examiner

APPARATUS AND METHOD FOR WARMING THE FLOOR OF A TRAILER

CROSS-REFERENCE TO RELATED APPLICATIONS

The present application is a continuation of U.S. patent application Ser. No. 12/469,534, filed on May 20, 2009, which claims priority to Canadian Patent Application No. 2,665,668, filed on May 8, 2009, which is hereby incorporated by reference in its entirety.

FIELD OF THE INVENTION

The present invention relates generally to the field of transportation. More particularly, the present invention relates to a trailer for the transportation of bulk materials.

BACKGROUND OF THE INVENTION

Generally, a trailer includes a chassis, a set of wheels for rollably driving the chassis on the ground, and a rigid container carried by the chassis. The rigid container comprises a floor, a sidewall, an access door for loading/unloading materials into the container. The container may include a roof. Some trailers include moving floors for unloading the materials transported by the trailer. The moving floor includes a plurality of longitudinal slats provided in parallel, and movable back and forth in a reciprocating manner. While in motion to load and/or unload materials in the trailer alternate slats may move in opposite directions.

Trailers used for the transportation of loose and moist materials such as sand or soil etc. in countries where the temperature drops below the freezing point, encounter unloading problems when the moist materials freeze on the walls and floor of the trailer and become hard to unload. Furthermore, when the materials transported in the trailer freeze on moving slats, the moving slats may break and/or damage the driving mechanism that operates them when the mechanism is activated by the user. The common solution to this problem is to drive the trailers into warm buildings usually known as "hot boxes", and to wait for the frozen materials to thaw.

In addition to being an expensive solution, the provision of such hot boxes is not possible at each unloading site. This solution is slow, especially since the heat takes a long time to arrive at the slats. It is also inefficient, as it requires heating the entire trailer before reaching the floor and inner walls of the trailer. A substantive amount of heat is also lost to the atmosphere when opening the doors for the trailer to drive in and out of the hot box.

It is, therefore, desirable to provide a method for thawing frozen materials transported in a trailer in an efficient and quick way.

SUMMARY OF THE INVENTION

It is an object of the present invention to obviate or mitigate at least one disadvantage of previous solutions for thawing frozen materials transported in trailers.

In a first aspect, the present invention provides a trailer comprising a chassis, a set of wheels for rollably driving the chassis on the ground, a container carried by the chassis including a wall, an access door for loading/unloading the container, and a floor comprising a plurality of longitudinal hollow shaped slats. The trailer comprises a circulation system for connecting the hollow shaped slats to a hot fluid source and includes a pump for circulating a stream of the hot fluid in the hollow shaped slats for thawing frozen materials transported on the slats.

The circulation system may include a feed pipe for receiving the hot fluid from the hot fluid source, a feed manifold for connecting the feed pipe to the slats for injecting the hot fluid into the slats, a return manifold for collecting the fluid from the slats, and a return pipe for returning the fluid collected by the return manifold to the hot fluid source for re-heating.

The circulation system may include a hot fluid pipe connected between the feed manifold and the return manifold, and provided in a wall extrusion for warming the wall of the trailer.

In an embodiment, the circulation system comprises a plug for insertion in an open end of the slats, and a fitting at the opposite end of the slats for injecting hot fluid at one end of the slats and collecting spent fluid from the other end for re-heating at the hot fluid source.

In another embodiment, the hot fluid is run in a hot fluid pipe inserted into the hollow slats. The slats may have first and second cavities formed by a support wall provided in an extrusion of the slats, and the hot fluid pipe may be inserted in the first cavity and returned from the second cavity in a U form. The hollow slats may further include a heat transfer fluid filling a space between the hot fluid pipe and an interior wall of the slats for improving transfer of heat between the hot fluid pipe and the slats.

The hot fluid source may be provided on board of the trailer for thawing frozen materials while the trailer is on its way to the unloading site. The hot fluid source may further include a heater unit including a conduit which runs therethrough for heating the fluid from the combustion gases of the engine of the truck driving the trailer.

In a further aspect, the present invention provides a method for thawing frozen materials transported in a trailer with a floor including a plurality of longitudinal hollow shaped slats, comprising the steps of providing a fluid input and a fluid output in at least one of the slats for running a stream of hot fluid through the slat, connecting the fluid input to a hot fluid source for providing hot fluid to the slat and returning spent fluid to the hot fluid source for re-heating, and circulating the stream of hot fluid between the slat and the hot fluid source using a pump.

The method may further comprise inserting a plug in an open end of the at least one slat, and inserting a fitting in a hole provided at an opposite end of the at least one slat. The plug and fitting are for injecting hot fluid in the at least one slat and collecting the same for re-routing to the hot fluid source.

Alternatively, the method may comprise inserting a hot fluid pipe inside an extrusion of the at least one slat and running the hot fluid inside the hot fluid pipe.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 18:
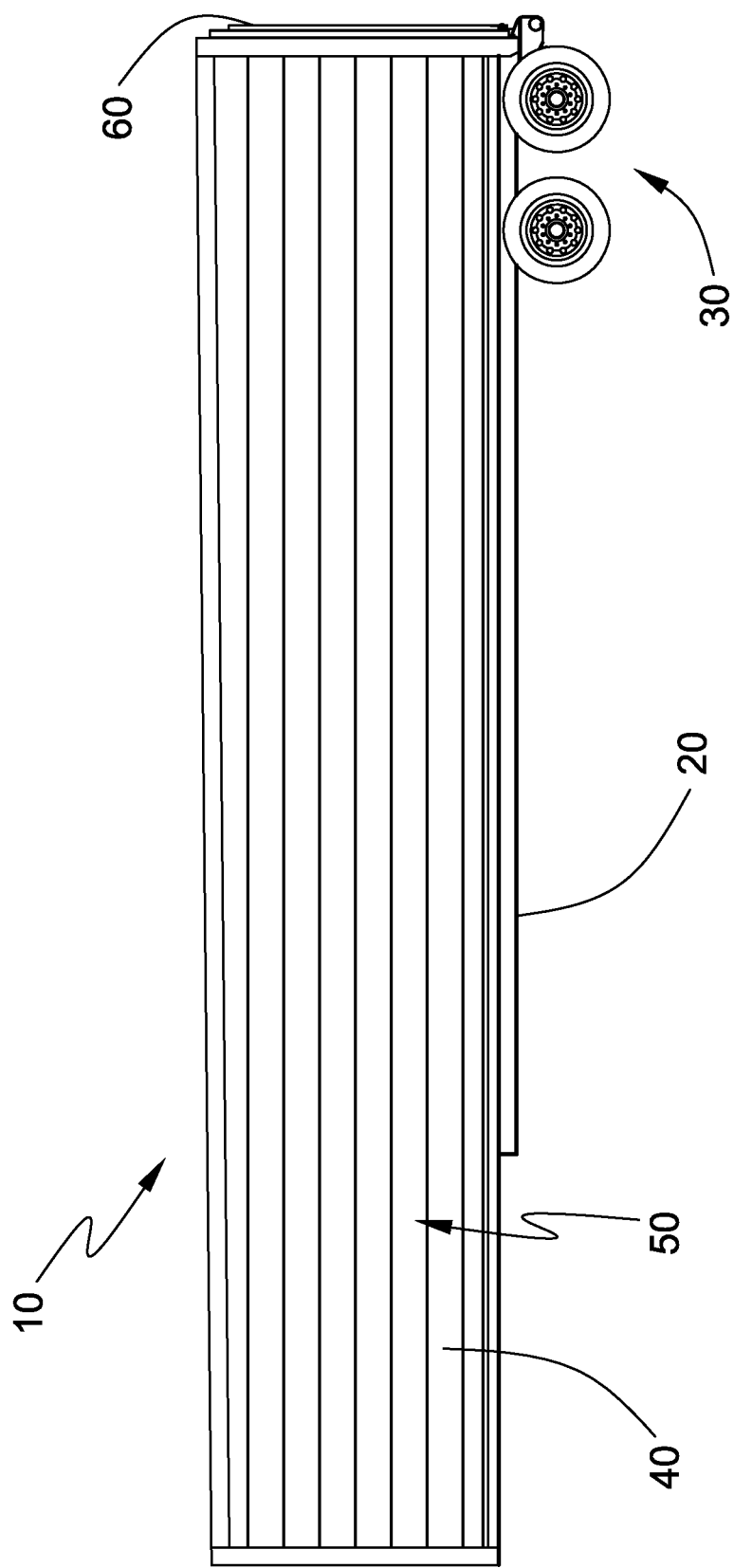
FIG. 18 illustrates a transport trailer a transportation trailer according to an embodiment of the invention.

Generally, the present invention provides a transportation trailer having a moving floor including a plurality of reciprocating slats for loading/unloading materials into the trailer. The trailer includes a system for warming the moving floor when the materials transported in the trailer freeze on the slats in cold weather. Using the pre-existing hollow structure of the slats, a stream of hot fluid or a hot fluid pipe is run inside the slats for thawing the frozen materials for unloading the trailer. The hot fluid may be provided from a hot fluid source on board of the trailer, for thawing the frozen materials while the trailer is on its way to the unloading site, or may be provided separately at the unloading site. As shown in FIG. 18, the transportation trailer 10 may have a chassis 20, a set of wheels 30 for rollably driving the chassis 20 on the ground, a container 40 carried by the chassis 20 including a wall 50, an access door 60 for loading/unloading the container 40, and a floor (not shown) comprising a plurality of longitudinal hollow shaped slats.

Figure 1A:
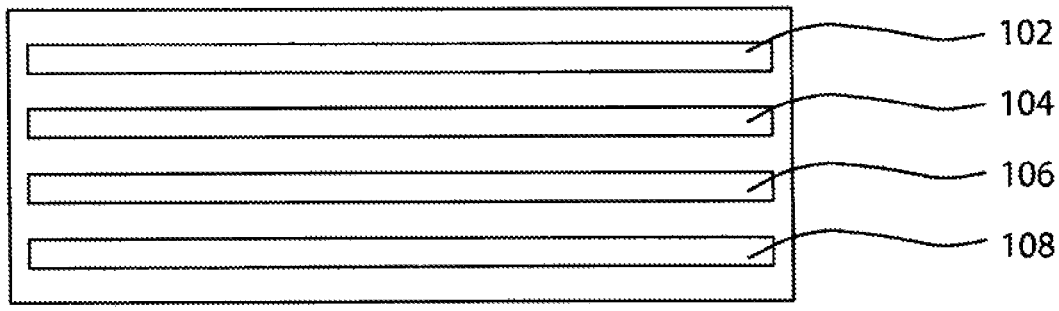
FIG. 1a to 1c are top views of a moving floor including a plurality of slats, illustrating different stages of motion of the slats.
Figure 1B:
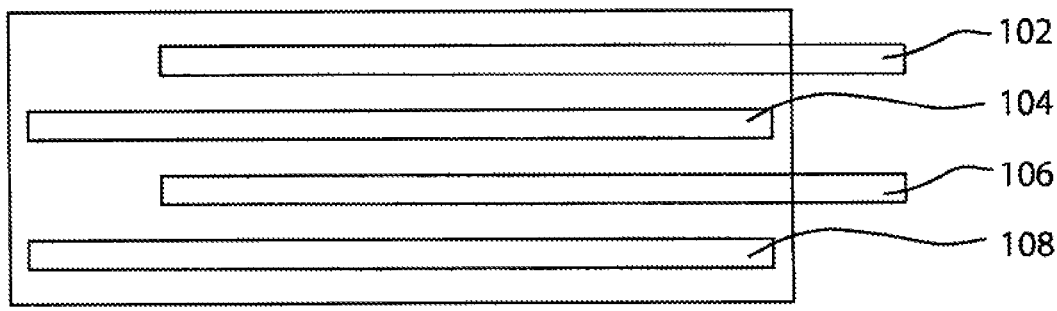
Figure 1C:
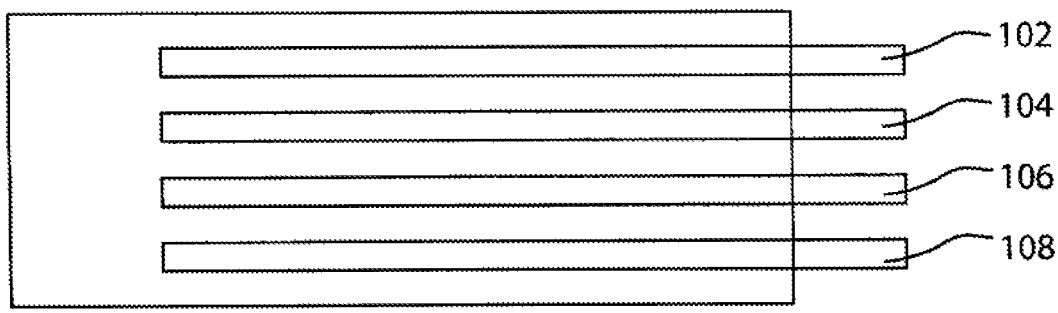

FIG. 1a is a top view of a traditional moving floor of a trailer. The moving floor includes a plurality of slats 102, 104, 106, and 108 etc. As shown in FIG. 1a, all the slats are in the storage position. FIG. 1b illustrates an example of the prior art moving floor, in which, only slats 102 and 106 are in motion. FIG. 1c illustrates another example, in which all the slats are in motion. However, it is possible that one or more slats are stationary and do not move e.g. any of both of slats 104 and 108 of FIG. 1b.

Figure 2:
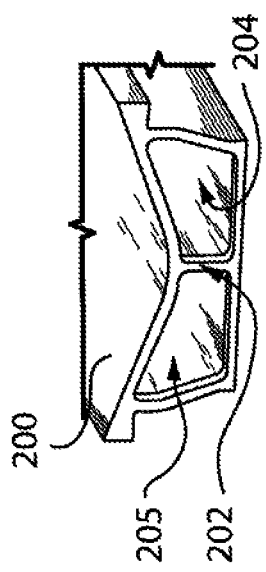
FIG. 2 is a front-end view of a traditional hollow shaped slat.

The slats of the trailer are hollow in order to reduce weight and manufacturing costs. FIG. 2 is a front-end view of a traditional hollow shaped slat 200. The slat 200 includes a support wall 202 which extends the length of the slat 200 and divides its extrusion into two cavities 204 and 205. The support wall 202 is provided substantially in the middle of the extrusion to protect the slat 200 from breaking and/or de-shaping when pressure is applied thereon by the materials transported in the trailer.

Figure 3:
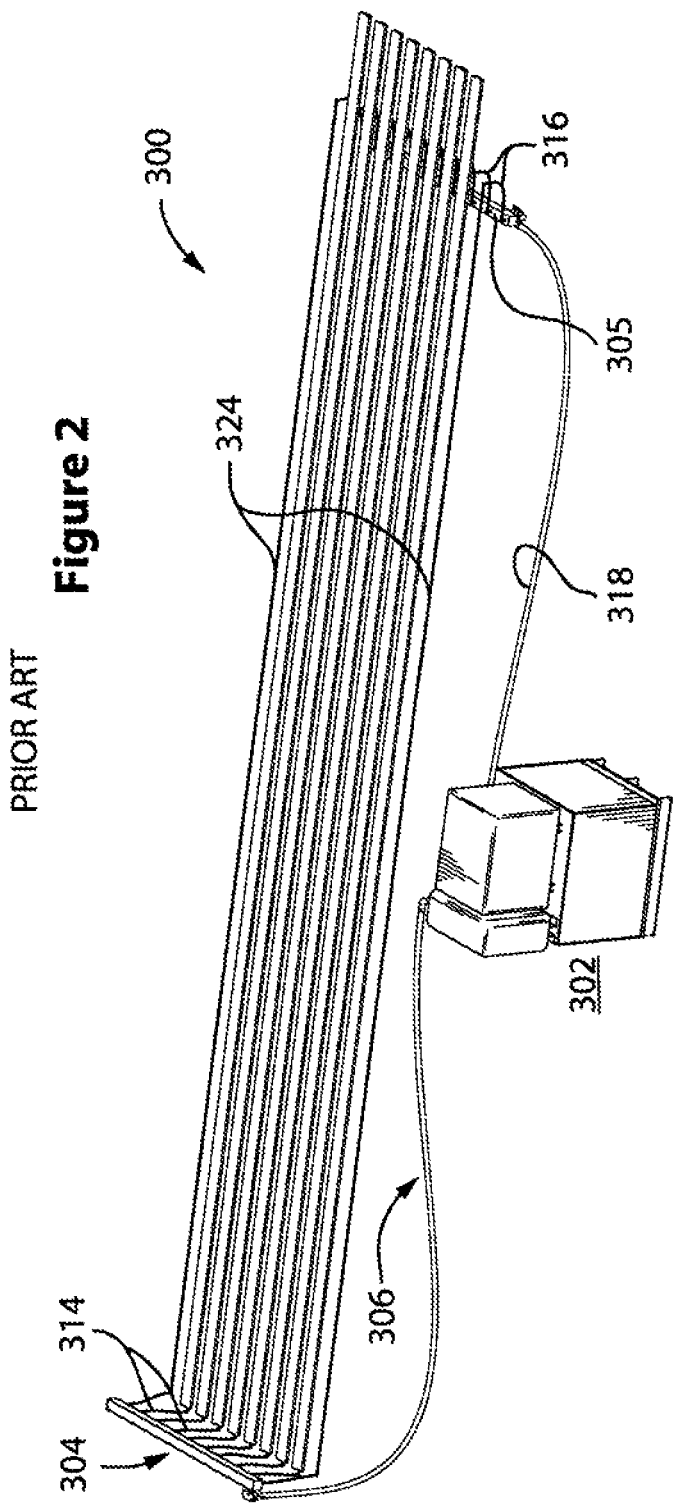
FIG. 3 illustrates a system for heating the floor of the trailer by injecting a stream of hot fluid inside the slats, in accordance with an embodiment of the invention.

In an embodiment of the invention, the extrusion of the slat is used for running a stream of hot fluid for thawing the materials frozen on the floor of the trailer. FIG. 3 illustrates a system 300 for heating the floor of the trailer by injecting a stream of hot fluid inside the slats. The system 300 is connected to a hot fluid source 302. The slats receive the hot fluid from a feed manifold 304 connected to the hot fluid source 302 by a pipe 306.

The hot fluid source 302 may be stationary, on board of the trailer or may be provided separately at the unloading site. The hot fluid source typically includes an electric heater or a fuel burner (not shown) for heating the fluid, a fluid tank (not shown) for storing and/or heating the fluid, and a pump (not shown) for circulating the fluid.

Figure 4:
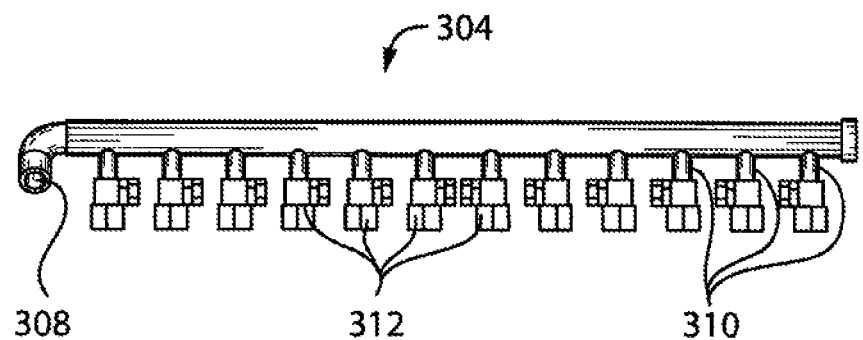
FIG. 4 illustrates an example of a manifold used in the system illustrated in FIG. 3.
Figure 5:
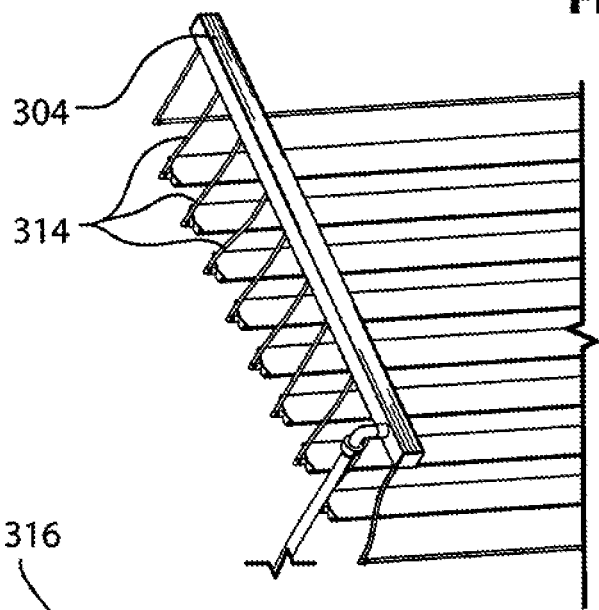
FIG. 5 illustrates the outlets of a feed manifold connected to an end of the slats.
Figure 6:
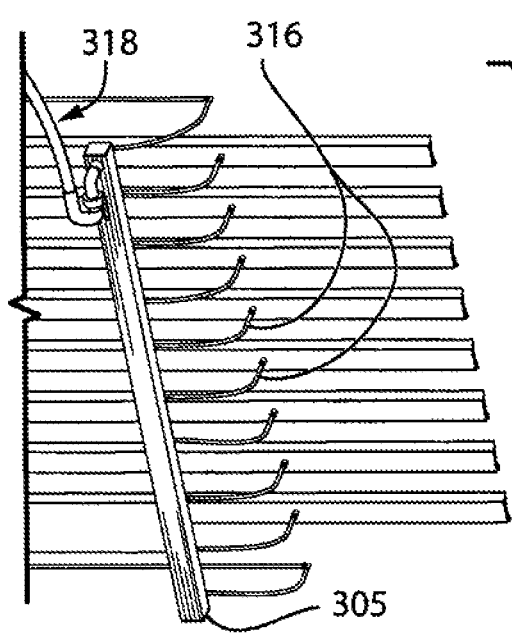
FIG. 6 illustrates the fluid being collected from the other end of the slats by pipes connected to a return manifold.

FIG. 4 illustrates an example of the manifold 304 in accordance with an embodiment of the invention. The manifold 304 includes an inlet 308 for receiving the hot fluid from the hot fluid source 302, and a plurality of outlets 310 for distributing the hot fluid among the plurality of slats. The manifold 304 may include one or more valves 312 to enable the user to control the flow of hot fluid inside the slats, especially that some of the slats may be stationary and the others movable. The outlets 310 of the feed manifold 304 are connected to an end of the slats by pipes 314 as exemplified in FIG. 5. The fluid is collected from the other end of the slats by pipes 316 connected to a return manifold 305, as exemplified in FIG. 6. The manifold illustrated in FIG. 4 may be used as a feed manifold 304 and as a return manifold 305. When the manifold 304 is used as a return manifold for collecting fluid from the slats, the outlets 310 are used as inlets to receive the fluid from the slats, and the inlet 308 is used as an outlet for returning the fluid to the hot fluid source 302 using a return pipe 318.

Figure 7:
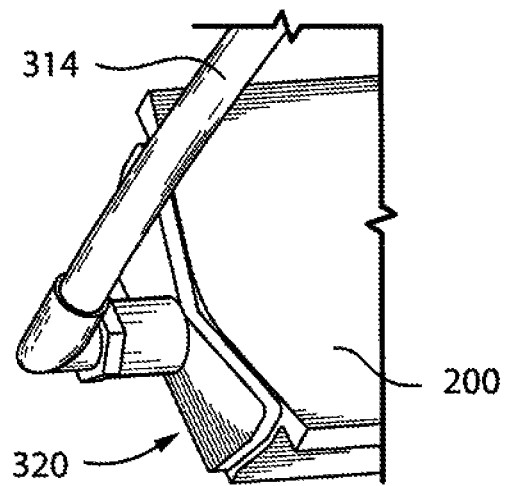
FIG. 7 illustrates a plug inserted at the front end of the slat shown in FIG. 2, for injecting fluid inside the cavities of the slats.
Figure 8:
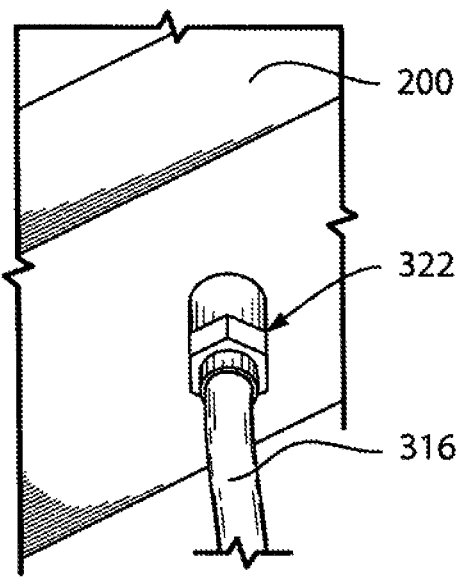
FIG. 8 illustrates a fitting inserted at the other end of the slats and forming a return path for the fluid from the slats.

In an embodiment of the invention, the hot fluid is run into the slats using a plug 320 that injects the hot fluid into cavities 204 and 205 (shown in FIG. 2), as exemplified in FIG. 7. The fluid may be collected from the other end of the slats by drilling a hole and inserting a fitting 322 for returning the fluid through pipes 316 into the return manifold 305 as exemplified in FIG. 8. The fluid is returned from the return manifold 305 to the hot fluid source 302 using return pipe 318 as shown in FIG. 3.

In an embodiment of the invention, a pipe 324 (shown in FIG. 3) is run in each sidewall of the trailer for thawing materials frozen on the sidewall. The pipe 324 is run in an extrusion formed in the sidewall. The extrusion is formed adjacent the slats to allow the heat to be transferred upward through the channels formed in the sidewall, as shown in FIG. 3. Similar to the slats, the pipe 324 receives the hot fluid from one of the outlets 310 or the feed manifold 304, and returns the fluid through the return manifold 305.

Figure 9:
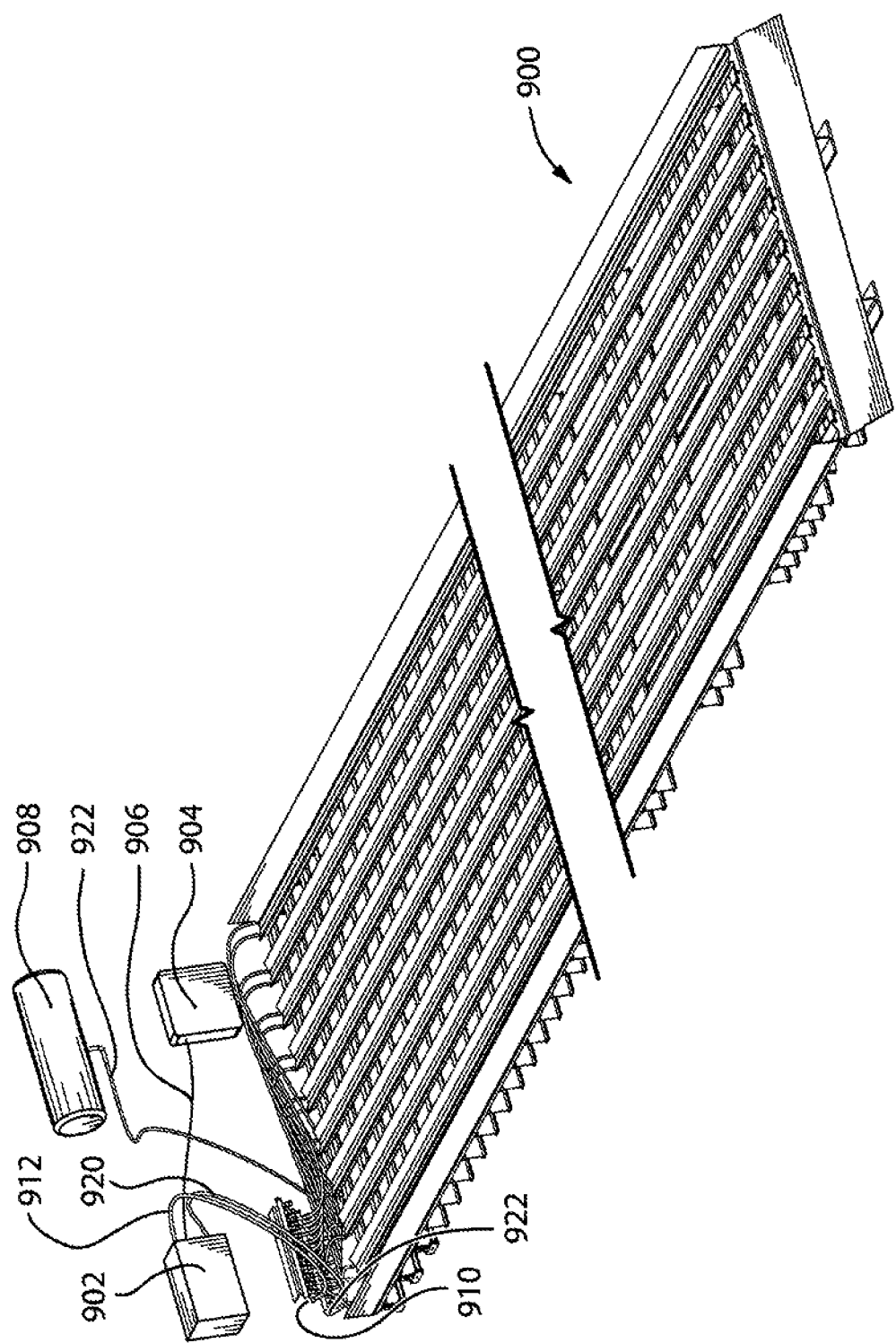
FIG. 9 illustrates a system for warming the floor of a trailer by running a hot fluid pipe inside the cavities of the slat, in accordance with another embodiment of the invention.
Figure 10:
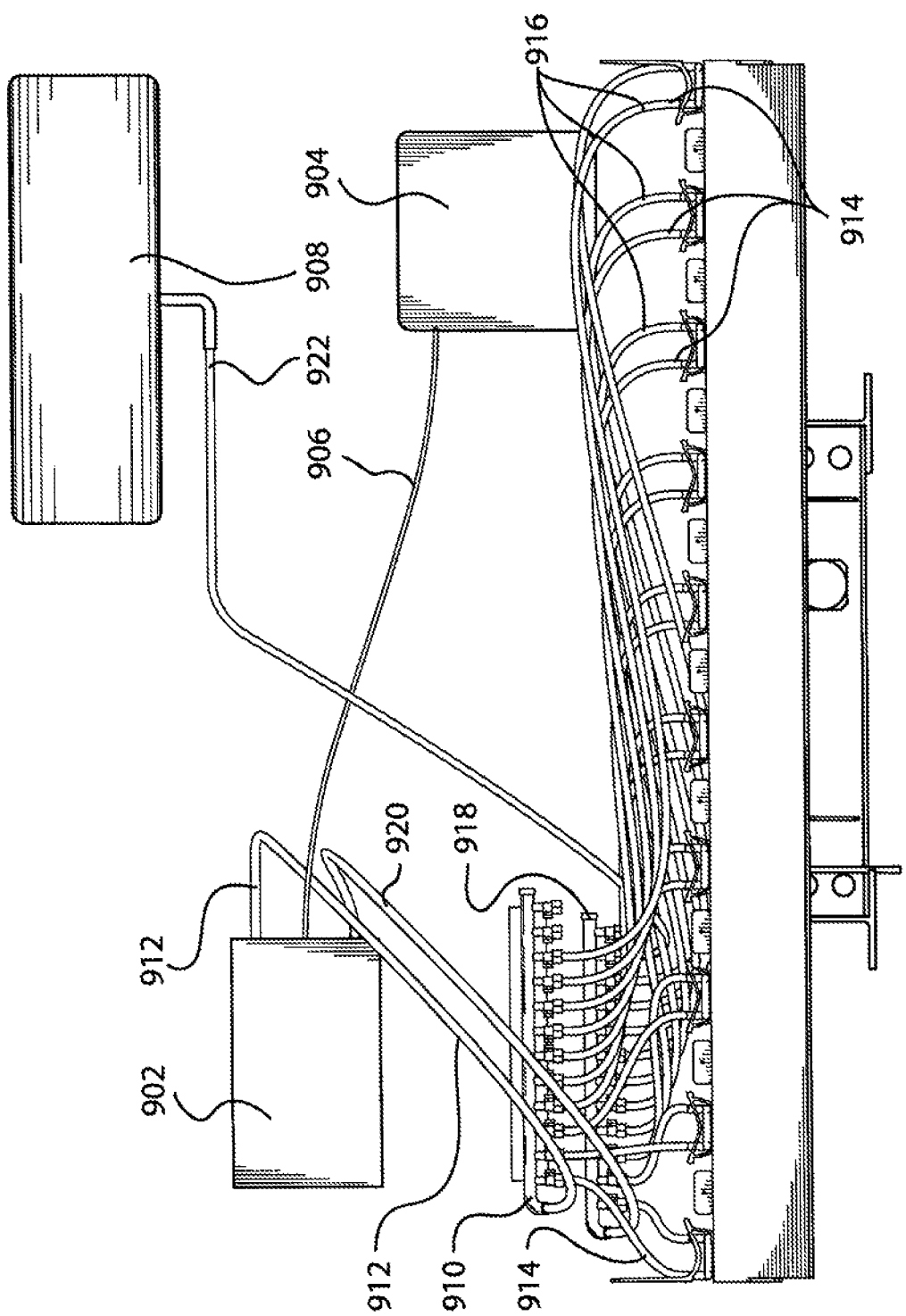
FIG. 10 is a rear view of the system shown in FIG. 9.

FIG. 9 illustrates a system 900 for warming the floor of a trailer, in accordance with another embodiment of the invention. In the system 900, the cavities 204 and 205 (Shown in FIG. 2) of the slats are used for running a hot fluid pipe inside the slat for warming the floor of the trailer, as opposed to running the hot fluid itself inside the cavities as described in the previous embodiments. FIG. 10 is a rear view of the system 900 shown in FIG. 9. The system 900 is connected to a hot fluid source 902. In an embodiment of the invention, the hot fluid source 902 includes a burner (not shown) which receives fuel from a fuel tank 904 by a fuel pipe 906, and an overflow tank 908. The hot fluid source 902 is connected to a feed manifold 910 by a feed pipe 912.

Figure 11:
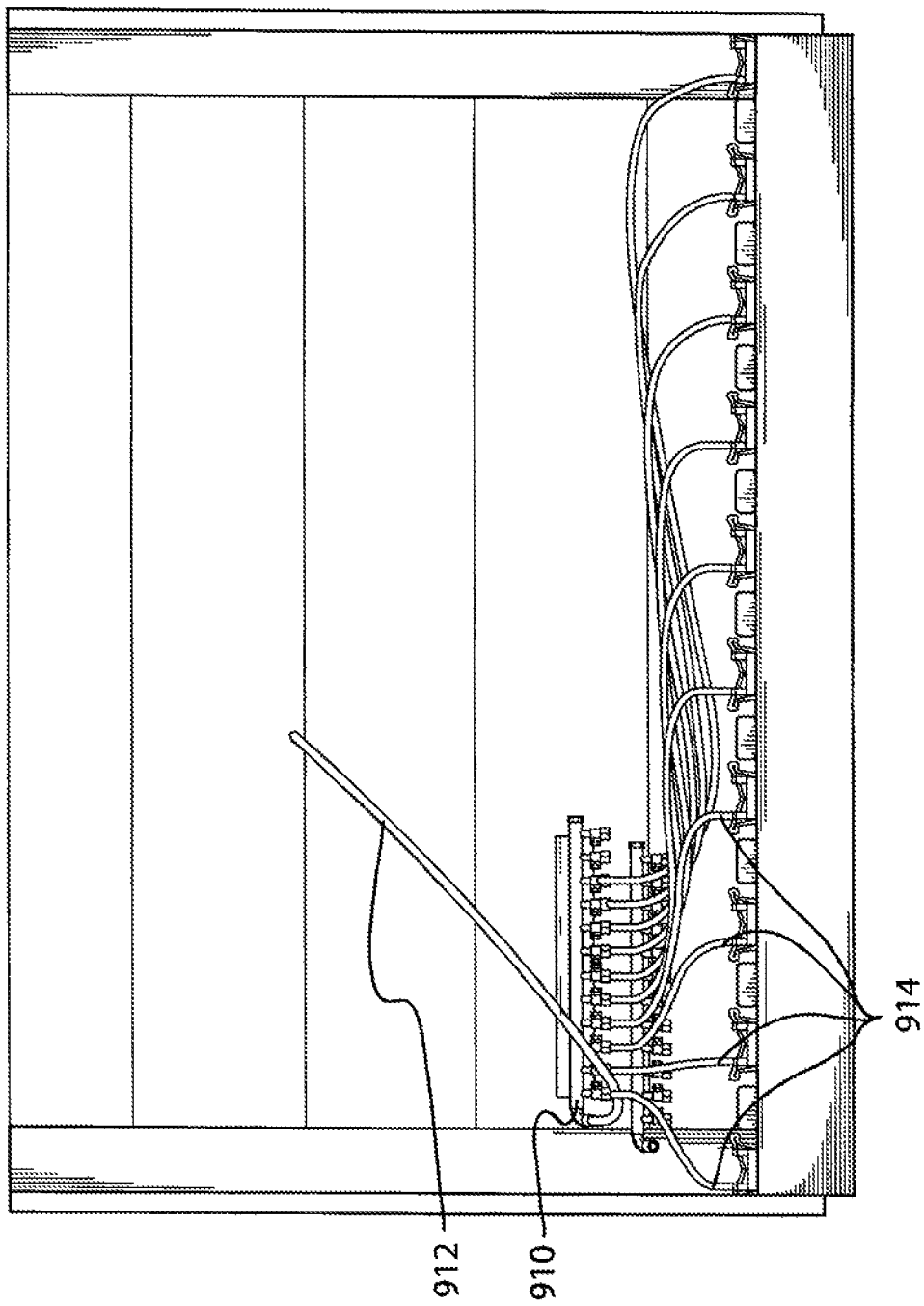
FIG. 11 is a rear partial view of the system of FIG. 9 illustrating the flow of hot fluid from the hot fluid source to the slats without a return.
Figure 12:
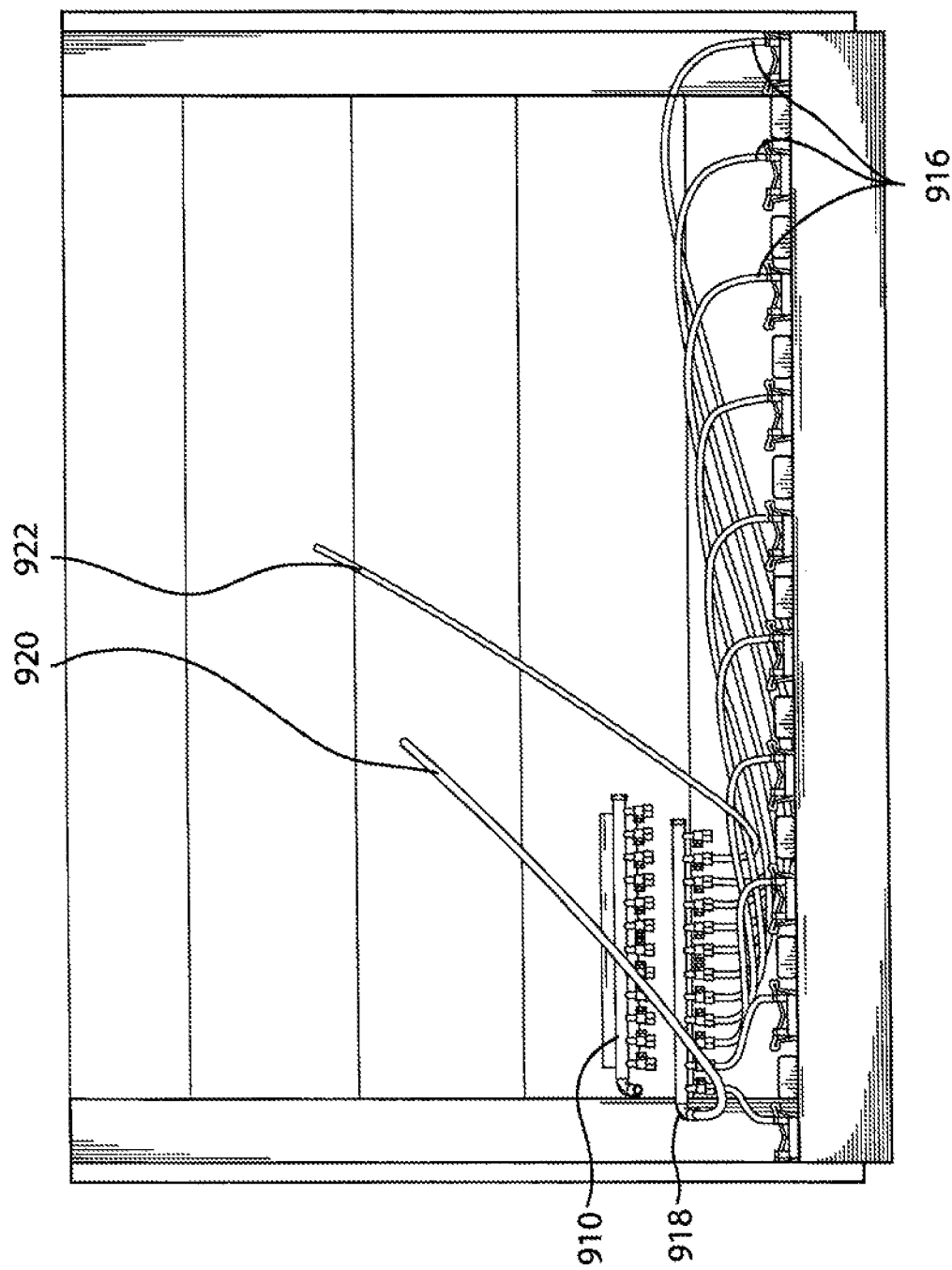
FIG. 12 is a rear partial view of the system of FIG. 9 illustrating the return of fluid from the slats to the hot fluid source for re-heating.

FIG. 11 is a rear partial view of the system 900 illustrating the flow of hot fluid from the hot fluid source 902 to the slats without a return. As illustrated in FIGS. 10 and 11, the feed manifold 910 distributes the hot fluid to the slats from its outlets by pipes 914. FIG. 12 is a rear partial view of the system 900 illustrating the return of fluid from the slats to the hot fluid source 902 for re-heating. The fluid is returned from the slats by pipes 916, collected by a return manifold 918 and sent back to the hot fluid source 902 by a return pipe 920. The return manifold 918 is also connected to the overflow tank 908 by an overflow pipe 922.

Figure 13:
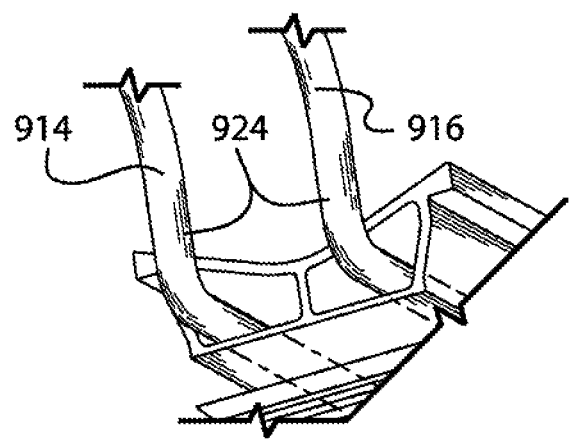
FIG. 13 illustrates a front end view of the slat when a fluid pipe is inserted therein.
Figure 14:
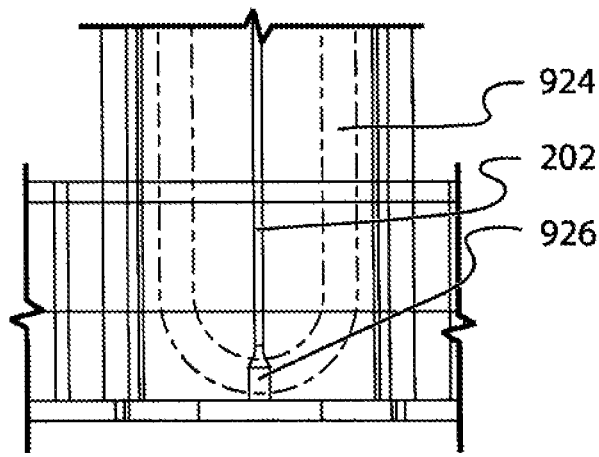
FIG. 14 is a cross sectional top view of a rear end of the slat showing a notch created in the support wall to create a return path for the fluid pipe across the support wall.
Figure 15:
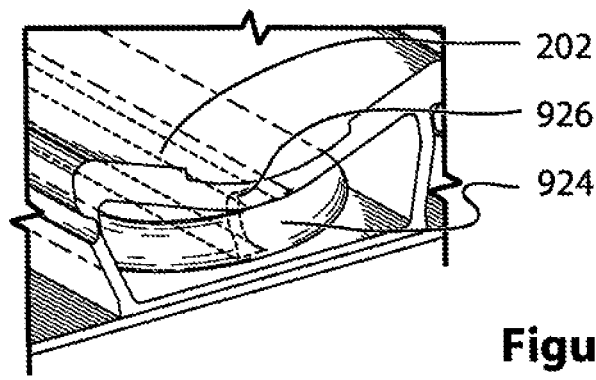
FIG. 15 is a side view of the rear end of the slat shown in FIG. 14.

Pipes 914 and 916 are connected to a pipe 924 at the front end of the slats. The pipe 924 runs inside the slat as shown in FIG. 13. FIG. 14 is a cross sectional top view of a rear end of the slat when the pipe is 924 is run therein. As shown in FIG. 14, a notch 926 is created in the support wall 202 that connects both cavities 204 and 206 to create a return path for the fluid pipe 924 across the support wall 202. FIG. 15 is a side view of the rear end of the slat shown in FIG. 14.

Although the hot fluid pipe 924 is run in a U form inside the cavities 204 and 206 of the slats, as shown in FIGS. 13 to 15, it is also possible to insert the hot fluid pipe from one end and retrieve it from the opposite end, similar to the way the fluid is collected from the rear end of the slats in the embodiments shown in FIGS. 3 to 8. Moreover, it is possible to fill the gap between the hot fluid pipe and the slat with a fluid in order to improve the circulation of heat in the slats.

Figure 16:
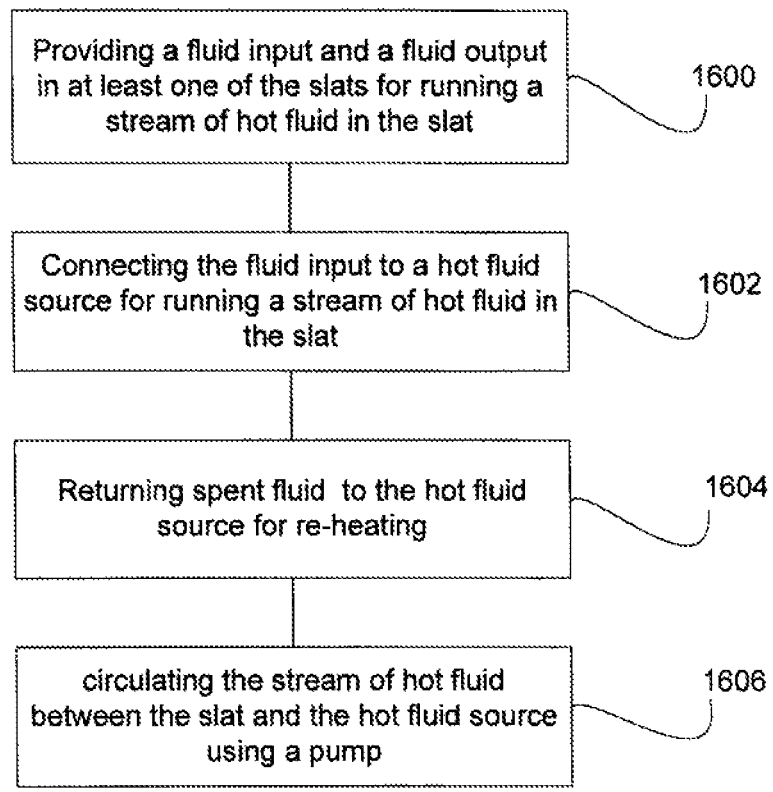
FIG. 16 is a flowchart illustrating the steps of thawing frozen materials transported in a trailer, in accordance with an embodiment of the invention.

FIG. 16 is a flowchart illustrating the steps of thawing frozen materials transported in a trailer, in accordance with an exemplary method of the invention. At step 1600, a fluid input and a fluid output are provided in selected slats for running a stream of hot fluid in an extrusion of the slats. The fluid inputs are connected to a feed pipe of a hot fluid source at step 1602, for injecting the hot fluid in the selected slats. At step 1604, spent fluid is returned to the hot fluid source for re-heating. At step 1606, a stream of hot fluid is circulated between the slats and the hot fluid source using a pump.

In an embodiment, step 1600 may include inserting a plug in an open end of the selected slats and inserting a fitting in a hole provided at an opposite end of the selected slats. The plug and the fitting are for injecting hot fluid in the selected slats and collecting the same for re-routing to the hot fluid source.

In another embodiment step 1600 may include inserting a hot fluid pipe inside the extrusion of the selected slats and running the hot fluid inside the hot fluid pipe. A fluid may be provided between the hot fluid pipe and an inner wall of the selected slat for improving circulation of heat between the hot fluid pipe and the selected slat. The hot fluid pipe may be inserted in a first cavity of the slat and returned from a second cavity in a U form. The first and second cavities are formed by a support wall provided in the extrusion of the selected slats.

Step 1602 may further include connecting the feed pipe to an inlet of a feed manifold, and connecting the fluid inputs to the outlets of the feed manifold. Step 1604 may further include connecting the return pipe to an outlet of a return manifold, and connecting the fluid outputs to the inputs of the return manifold.

In an embodiment, the hot fluid source is provided onboard the trailer, and the method may further include connecting an exhaust pipe of an engine to a conduit running through the hot fluid source for heating the fluid from the combustion gases of the engine when the engine is running.

In the embodiments shown in FIGS. 3 and 9, the hot fluid source (302 in FIG. 3, and 902 in FIG. 9) may be stationary on board of the trailer for warming the floor of the trailer as the trailer is on its way to the unloading site, or may be provided separately at the unloading site for releasable connection to the feed pipe (306 in FIG. 3, and 912 in FIG. 9) and the return pipe (318 in FIG. 3, and 920 in FIG. 9) of the system.

Figure 17:
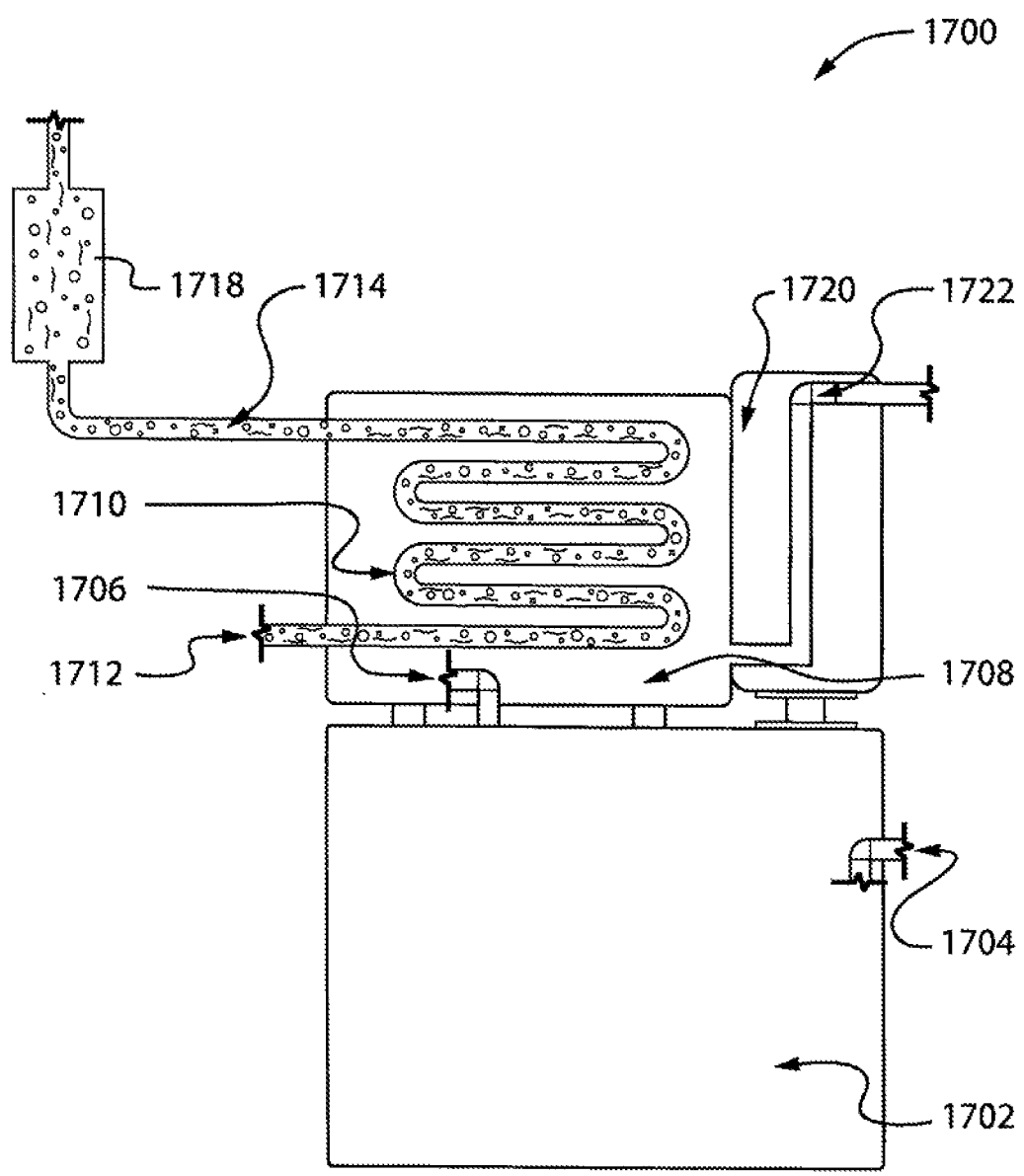
FIG. 17 illustrates a hot fluid source using the combustion gas of the engine of the truck for heating the fluid.

In an embodiment of the invention, the fluid is heated in a more economic and environmently friendly manner in a stationary hot fluid source that is provided on board of the trailer. FIG. 17 illustrates an example of a stationary hot fluid source 1700 which heats the fluid using the combustion gases of the engine of the truck driving the trailer. As shown in FIG. 17, the hot fluid source 1700 includes a storage tank 1702 having an inlet 1704 for receiving the fluid returned from the slats, and an outlet 1706 for providing the fluid to the heater unit 1708. Although not absolutely necessary, the storage tank 1702 provides the heater unit with a steady flow of fluid that accommodates for any overflow or shortage of fluid from the inlet 1704.

The heater unit 1708 includes a conduit 1710 which runs through the heater unit 1708. The conduit 1710 includes an inlet 1712 for connecting to the exhaust system of the engine and an outlet 1714 for connecting to a muffler 1718 or the atmosphere. The conduit 1710 heats the fluid inside the heater unit by the combustion gases produced by the engine of the truck driving the trailer (not shown). A pump 1720 is also provided for circulating the fluid through the outlet 1722.

While the embodiments shown in FIGS. 1 to 17 are directed to a walking floor including reciprocating slats, the invention is not limited to walking floors and may be applied in stationary applications and in non-moving slats.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A transportation trailer for bulk materials comprising:
   a chassis;
   a set of wheels for rollably supporting the chassis on the ground;
   a container carried by the chassis including a wall, an access door for loading/unloading the container, and a moving floor comprising a plurality of extruded moving slats having a longitudinal internal cavity;
   a source of heated fluid; and
   a circulation system for supplying heated fluid from the source of heated fluid to the cavity of at least one of the slats and returning spent fluid from the cavity back to the source of heated fluid, the system including a pump for circulating the heated fluid between the source of heated fluid and the cavity for heating the moving floor, wherein the circulation system includes:
   a feed pipe for receiving the heated fluid from the heated fluid source;

a feed manifold for receiving the heated fluid from the feed pipe;

first pipes operably connected to the feed manifold and the slats, thereby injecting the heated fluid into the slats;

a return manifold for collecting the fluid from the slats;

second pipes operably connected to the return manifold and the slats, thereby collecting the fluid from the slats; and a return pipe for returning the fluid collected by the return manifold to the heated fluid source for re-heating.

2. The transportation trailer of claim 1, wherein the circulation system further includes a heated fluid pipe connected between the feed manifold and the return manifold, and provided in a wall extrusion for warming the wall of the trailer.

3. The transportation trailer of claim 1, wherein the circulation system further comprises a plug for insertion in an open end of the at least one of the slats, and a fitting spaced from an opposite end of the at least one of the slats for injecting heated fluid at one end of the at least one of the slats and collecting spent fluid from the other end for re-heating at the heated fluid source.

4. The transportation trailer of claim 1, wherein the heated fluid is run in a heated fluid pipe inserted into the hollow slats.

5. The transportation trailer of claim 4, wherein the slats have first and second cavities formed by a support wall provided in an extrusion of the slats, and the heated fluid pipe is inserted in the first cavity and returned from the second cavity in a U form.

6. The transportation trailer of claim 4, the hollow slats further including a heat transfer fluid filling a space between the heated fluid pipe and an interior wall of the slats for improving transfer of heat between the heated fluid pipe and the slats.

7. The transportation trailer of claim 1, wherein the feed manifold includes one or more valves for controlling the flow of heated fluid inside the slats.

8. The transportation trailer of claim 1, wherein the heated fluid source is provided on board of the trailer for thawing frozen materials while the trailer is on its way to the unloading site.

9. The transportation trailer of claim 8, further comprising a heater unit in the heated fluid source, said heater unit including a conduit which runs therethrough for heating the fluid from the combustion gases of the engine of the truck driving the trailer.

10. The transportation trailer of claim 1, wherein the circulation system supplies the heated fluid to one end of the at least one of the slats and removes the spent fluid remote from the one end.

11. The transportation trailer of claim 1, wherein the circulation system supplies the heated fluid and removes the spent fluid at opposite ends of the at least one of the slats.

12. The transportation trailer of claim 1, wherein the at least one of the slats has opposite first and second ends and a pair of parallel longitudinal internal cavities extending between the first and second ends, and the circulation system supplies the heated fluid to a first of the pair of cavities at the first end and removes spent fluid from a second of the pair of cavities at the first end, the at least one of the slats further including a conduit for connecting the first and second of the pair of cavities at the second end.

* * * * *